Jan. 16, 1934.     C. A. COTTAM     1,943,723
CALKING DEVICE
Filed May 26, 1931     2 Sheets-Sheet 1

INVENTOR
Charles A. Cottam
BY
Synnestvedt & Lechner
ATTORNEYS

Jan. 16, 1934. C. A. COTTAM 1,943,723
CALKING DEVICE
Filed May 26, 1931 2 Sheets-Sheet 2

INVENTOR
Charles A. Cottam
BY
Symmestoedt & Lechner
ATTORNEYS

Patented Jan. 16, 1934

1,943,723

UNITED STATES PATENT OFFICE 1,943,723

CALKING DEVICE

Charles A. Cottam, Chattanooga, Tenn., assignor to International Combustion Engineering Corporation, New York, N. Y., a corporation of Delaware Application May 26, 1931. Serial No. 540,107

3 Claims. (Cl. 78—47)

My invention relates to a device for calking rivets and is particularly useful in connection with the calking of rivets on the interior of a boiler drum.

It is a primary object of my invention to provide a self-positioning calking device which can be readily and easily placed in operative relation to the rivet to be calked and can be quickly and easily moved from rivet to rivet.

It is a further object of my invention to provide a rivet calking device which will firmly calk the rivet regardless of any irregularities which may occur in the head thereof.

It is a further object of my invention to provide a rivet calking device wherein calking tools are positioned in operation by engagement thereof with the member to be calked.

The foregoing, together with such other objects which may hereinafter appear or are incident to my invention, I attain by means of a construction which I have illustrated in the accompanying drawings, wherein—

Figure 1:
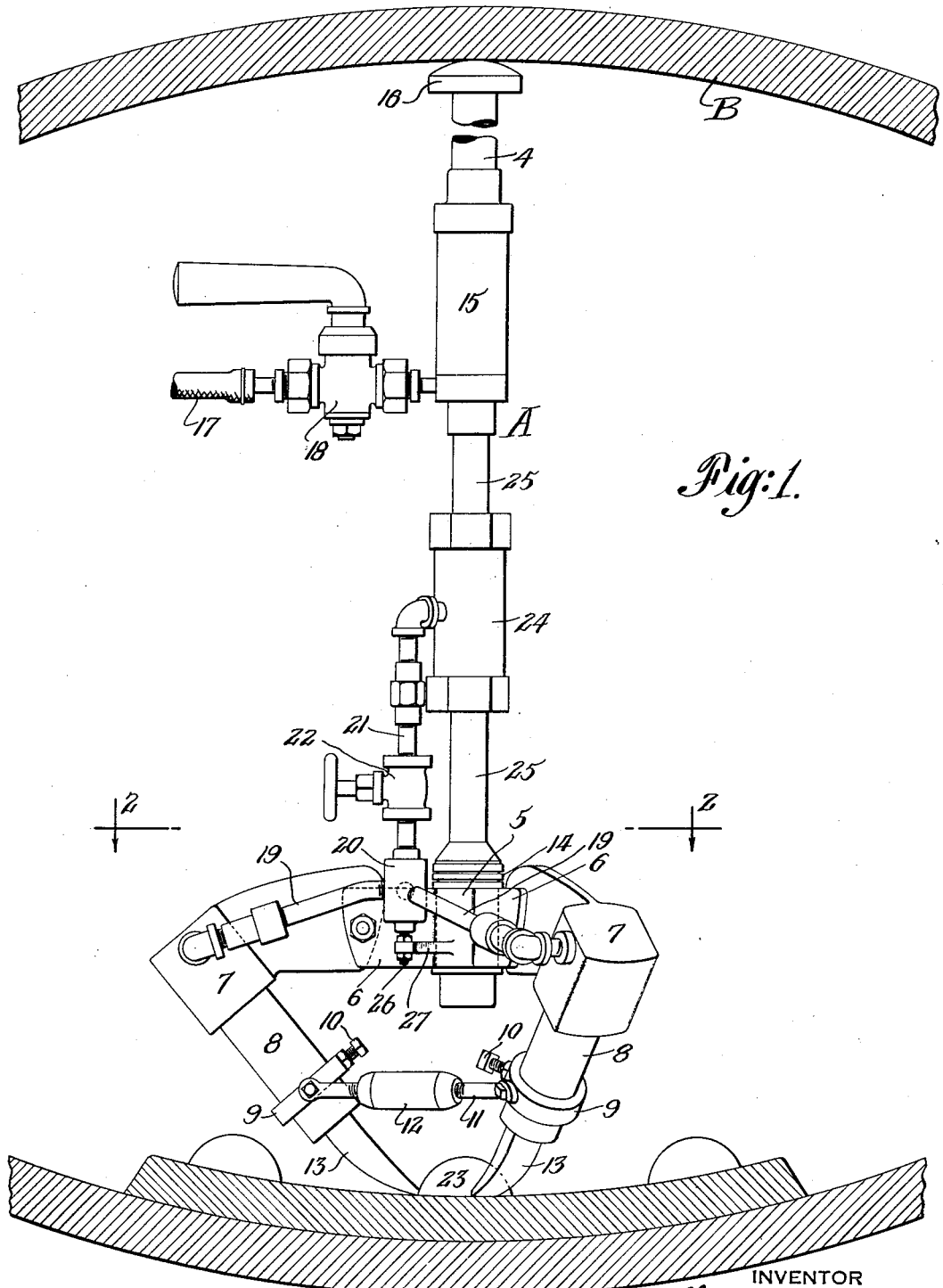
Figure 2:
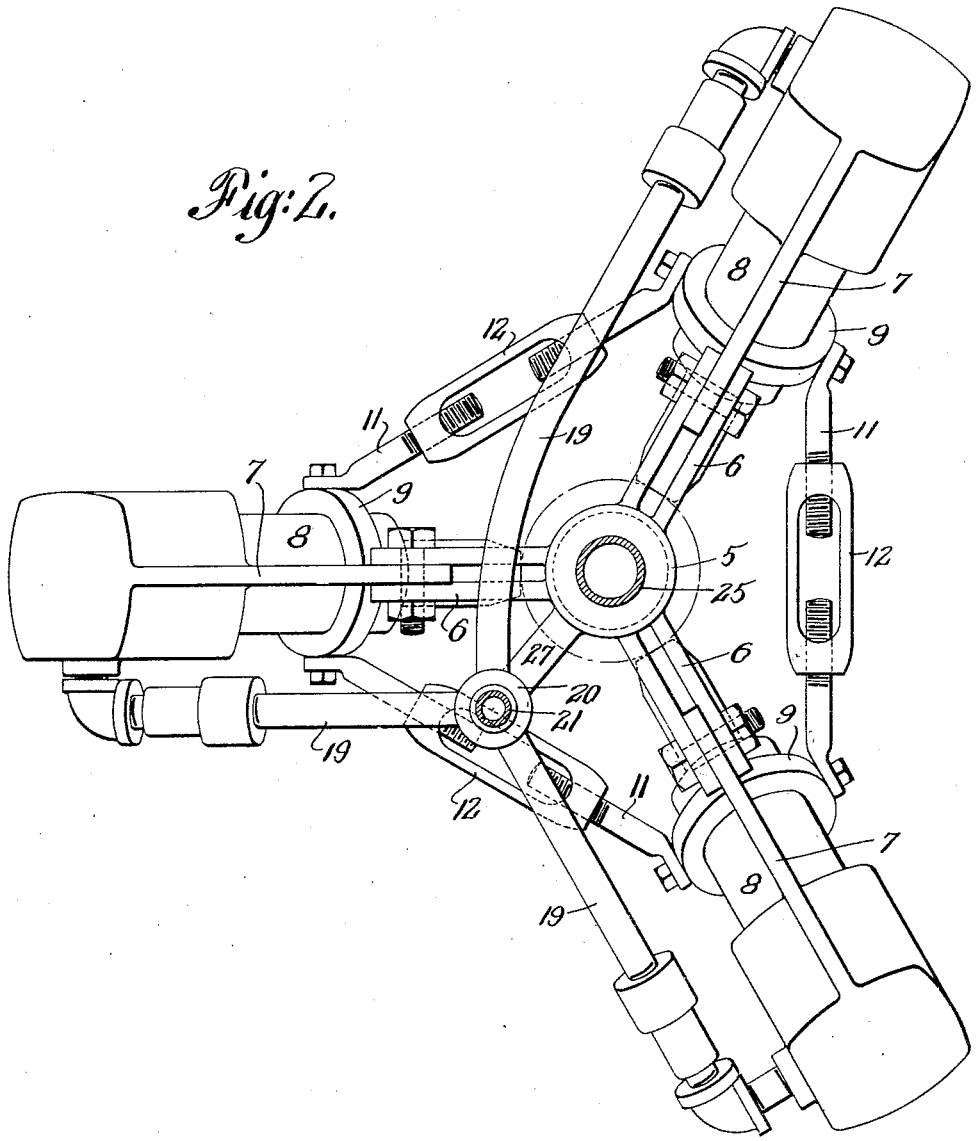

Figure 1 is a vertical elevation of the device in position in a boiler drum; and Figure 2 is a plan section on the line 2—2 of Figure 1.

The calking device comprises a central hollow cylindrical portion A consisting of the pipe 25 and air dolly 15 to which the pipe 25 is connected. The air dolly 15 has a piston 4 with head 16 which is adapted to engage the drum B opposite the rivet to be calked.

At the lower end the pipe 25 carries a roller bearing 14 about which is mounted a collar 5 having three substantially equally spaced radially extending split ear members 6. Brackets 7 are pivotally secured to the ears 6 and hold reciprocating hammers 8 which, in the embodiment shown in the drawing, are pneumatic hammers. Electric hammers could, of course, be used if desired.

These hammers 8 extend inwardly and downwardly with respect to the calking device as a whole and are provided with calking tools 13 of the usual character which engage the rivet 23 at substantially equally spaced points about the periphery thereof.

The hammers 8 are held in position by means of rods 11 secured to collars 9 about the hammers. The rods 11 are connected one to the other by means of turnbuckles 12. The collars 9 are held in position about the hammers 8 by means of set screws 10. The position of the hammers may be readily adjusted to accommodate them to different size rivets by proper adjustment of the turnbuckles 12 and by movement of the collars 9 along the hammers 8.

Compressed air is supplied to the calking device from any suitable source of supply by means of flexible hose 17 connected to valve member 18 which is in turn connected to the lower end of the air dolly 15 from which the air flows into pipe 25. The sleeve 24 is placed around pipe 25 and is packed at both ends so that it may turn with reference to pipe 25 without permitting air to escape. The pipe 25 has openings within the sleeve 24 to permit the air to enter the interior sleeve. From the sleeve 24 air is supplied to the hammers by means of pipe line 21 leading to manifold 20 from which the lines 19 lead to the individual hammers. The line 21 is controlled by valve 22.

The lower end of manifold 20 is supported by the adjustable bolt 26 carried by lug 27 attached to collar 5. When the bolt 26 is tightened against the manifold 20 the line 21 and associated parts will be securely held in position and will not be substantially affected by vibration of the hammers.

As the collar 5 and sleeve 24 can turn with reference to the pipe 25 it will be seen that the hammers 8 and calking tools 13 can be moved around the entire periphery of the rivet to be calked.

The operation of the calking device is as follows: The calking tools 13 are first placed in operative relation to the periphery of the rivet to be calked. With the calking device held above this rivet valve 18 is opened to admit air to the dolly 15. This forces the piston 4 outwardly until the head 16 thereof engages the drum opposite to the rivet to be calked. The valve 22 is then opened to admit air to the hammers 8. The calking tools 13 will be then rapidly reciprocated, striking the rivet at the periphery thereof to perform the calking operation. As the collar 5 and sleeve 24 can turn with reference to the pipe 25 the hammers 8 and calking tools 13 can be moved around the rivet until the entire periphery thereof has been calked.

The calking device is positioned with reference to the rivet solely by the engagement of the calking tools 13 with the particular rivet being calked. The three calking tools 13 reciprocate so rapidly that they support and position the calking device solely by the engagement thereof with the rivet. It is, of course, necessary that there be three or more calking tools operating on the rivet in order to hold the device properly, but I have found that when three or more calking tools are used in this manner it is unnecessary and undesirable to have any other means of positioning the calking device with respect to the rivet.

For example, if the rivet head has any irregularities and the calking device is held in fixed position with reference thereto, improper calking of the rivet may follow. The same is true if such calking device should be improperly adjusted in fixed position with reference to the rivet.

Such difficulties are entirely eliminated where the position of the calking device and calking tools is determined solely by the engagement of the calking tools 13 with the head of the rivet for, with such an arrangement, the tools will automatically assume proper position with reference to the rivet by reason of the fact that it is the engagement of the calking tools with the rivet which determines the position.

As has been pointed out above, the hammers 8 may be swung in and out in order to adjust the position of the tools 13 for different size rivets, and with the position of the hammers properly adjusted, no support other than the calking tools 13 is necessary for the hammer.

The reaction from the hammers is taken up by means of the cushioning effect of the air in the dolly 15 acting on the piston 4. Other types of reaction members could, of course, be used.

What I claim is:

1. In a rivet calking device a support including a reaction member, three or more hammers having reciprocating calking tools, the said hammers being rotatably and pivotally mounted on said support and substantially equally spaced peripherally thereof the said device being positioned with relation to the member to be calked by the engagements of the calking tools with the member to be calked and means for adjusting the relative position of the hammers.

2. In a rivet calking device a support including a reaction member, three or more hammers having reciprocating calking tools, the said hammers being rotatably and pivotally mounted on said support and substantially equally spaced peripherally thereof the said device being positioned with relation to the member to be calked by the engagements of the calking tools with the member to be calked and means for adjusting the relative position of the hammers comprising rods with turnbuckles extending between hammers.

3. In a rivet calking device a hollow support including a reaction member, a collar rotatably mounted on said support, three or more hammers having reciprocating calking tools the said hammers being carried by said collar, and substantially equally spaced peripherally thereof, a sleeve rotatably mounted about said support, a passage from the hollow support to the interior of the sleeve, means supplying compressed air to the hollow support and means connecting the sleeve with the hammers, the sleeve and hammers and associated parts all being rotatable with reference to the support, the device being positioned with relation to the member to be calked by the engagements of the calking tools with the member to be calked.

CHARLES A. COTTAM.